United States Patent
Brown et al.

(10) Patent No.: US 10,810,307 B2
(45) Date of Patent: Oct. 20, 2020

(54) WIRELESS LOCKSET WITH ANTI-HACKING FEATURE

(71) Applicant: Spectrum Brands, Inc., Middleton, WI (US)

(72) Inventors: Troy M. Brown, Lake Forest, CA (US); Tam Bui, Fountain Valley, CA (US)

(73) Assignee: Spectrum Brands, Inc., Middleton, WI (US)

( * ) Notice: Subject to any disclaimer, the term of this patent is extended or adjusted under 35 U.S.C. 154(b) by 119 days.

(21) Appl. No.: 16/086,692

(22) PCT Filed: Mar. 23, 2017

(86) PCT No.: PCT/US2017/023747
§ 371 (c)(1),
(2) Date: Sep. 20, 2018

(87) PCT Pub. No.: WO2017/165610
PCT Pub. Date: Sep. 28, 2017

(65) Prior Publication Data
US 2019/0106906 A1 Apr. 11, 2019

Related U.S. Application Data

(60) Provisional application No. 62/312,709, filed on Mar. 24, 2016.

(51) Int. Cl.
*E05B 47/00* (2006.01)
*G06F 21/55* (2013.01)
(Continued)

(52) U.S. Cl.
CPC ........ *G06F 21/552* (2013.01); *E05B 47/0001* (2013.01); *G06F 11/00* (2013.01);
(Continued)

(58) Field of Classification Search
None
See application file for complete search history.

(56) References Cited

U.S. PATENT DOCUMENTS 7,051,561 B2 * 5/2006 Moon ................. E05B 47/0673
340/5.6
9,631,400 B2 * 4/2017 Liu ..................... E05B 47/0012
(Continued)

FOREIGN PATENT DOCUMENTS

EP 1612742 A2 1/2006

OTHER PUBLICATIONS

International Search Report and Written Opinion for PCT/US2017/023747 (dated Jun. 22, 2017).

*Primary Examiner* — K. Wong
(74) *Attorney, Agent, or Firm* — Merchant & Gould P.C.

(57) ABSTRACT

A wireless lockset with integrated anti-hacking methods is described herein. The integrated anti-hacking methods in the wireless lockset allows the detection of unauthorized access by one or more individuals. The integrated anti-hacking methods can detect an anomaly regarding wireless command sequence numbers, timing of received commands or flooding attack, and/or unauthorized access based on the MAC address of a command-issuing device. Upon detection of a hacking attempt, the wireless lockset performs one or more actions.

20 Claims, 6 Drawing Sheets

(51) Int. Cl.
  *G06F 11/00*   (2006.01)
  *G07C 9/00*    (2020.01)
  *H04W 12/12*   (2009.01)
  *H04W 12/08*   (2009.01)
  *H04L 29/06*   (2006.01)
  *H04L 29/12*   (2006.01)

(52) U.S. Cl.
  CPC ........... *G07C 9/00* (2013.01); *G07C 9/00174* (2013.01); *G07C 9/00571* (2013.01); *H04W 12/0806* (2019.01); *H04W 12/1202* (2019.01); *E05B 2047/0094* (2013.01); *E05Y 2900/132* (2013.01); *G07C 2009/00769* (2013.01); *H04L 61/6022* (2013.01); *H04L 63/1416* (2013.01)

(56)          References Cited

U.S. PATENT DOCUMENTS

| | | | |
|---|---|---|---|
| 9,670,696 B2* | 6/2017 | Chong | G07C 9/00944 |
| 9,691,198 B2* | 6/2017 | Cheng | G07C 9/00944 |
| 9,767,632 B2* | 9/2017 | Johnson | G06F 3/04847 |
| 2005/0179518 A1 | 8/2005 | Kawamura et al. | |
| 2011/0054735 A1 | 3/2011 | Kamiya | |
| 2014/0010691 A1 | 1/2014 | Lanigan et al. | |
| 2014/0223557 A1 | 8/2014 | Card et al. | |
| 2014/0250956 A1 | 9/2014 | Chong | |
| 2015/0281404 A1 | 10/2015 | Kuruse et al. | |
| 2019/0100940 A1* | 4/2019 | Imanuel | E05B 47/0001 |

* cited by examiner

WIRELESS LOCKSET WITH ANTI-HACKING FEATURE

RELATED APPLICATIONS

This application is a National Stage Application of PCT/US2017/023747, filed Mar. 21, 2017, which claims the benefit of U.S. Provisional Application Ser. No. 62/312,709 filed Mar. 24, 2016, which applications are incorporated herein by reference. To the extent appropriate, a claim of priority is made to each of the above disclosed applications.

TECHNICAL FIELD

This disclosure relates generally to locks; in particular, this disclosure relates to a wireless lockset with integrated anti-hacking processes.

BACKGROUND AND SUMMARY

Security systems are in widespread use in residential and commercial markets. These devices control ingress through doors to secured areas, such as a building or other secured space, by requiring certain authorized credentials. Existing security systems may be subject to different types of hacking which have surfaced during recent years. For example, an unauthorized person may attempt to flood a security system with numerous commands in a short time period. In some cases, an unauthorized person may attempt to confuse the security system by sending commands with high frame numbers to be executed prior to other commands. These are made by unauthorized persons to gain access to the security system. The need for more intelligence in door locksets is necessary to minimize the risk of a hacking attack and certainly to prevent unauthorized access to secured areas.

According to one aspect, this disclosure provides a wireless lockset with the ability to detect potential hacking attempts. For example, in some embodiments, the lockset could detect quantity and timing of specific commands issued to the lockset and surrounding wireless access control devices. The lockset can detect when an anomaly in the number of commands that is being sent to it (flooding attack) and also the timing (faster than usual requests) has occurred. In some cases, the lockset also is able to identify and track the wireless command sequence numbers and will respond when an anomaly occurs with the sequence number. For example, when a command with an out of order sequence number is received, the lockset could detect this anomaly as a potential hacking attempt. Depending on the circumstances, the lockset may also be able to track the identity of the access control panel/hub and discern when it is being sent commands from a control panel/hub that is different than that originally assigned. Upon detection of any of these potential hacking anomalies, the lockset may take certain actions, including, but not limited to: timeouts, keypad disable, wireless disable, notifications, audible alarms, wireless alarms, LED indicators, and/or automatically lock/unlock.

BRIEF DESCRIPTION OF THE DRAWINGS

The detailed description makes reference to the accompanying figures in which.

DETAILED DESCRIPTION OF THE DRAWINGS

Figure 1:
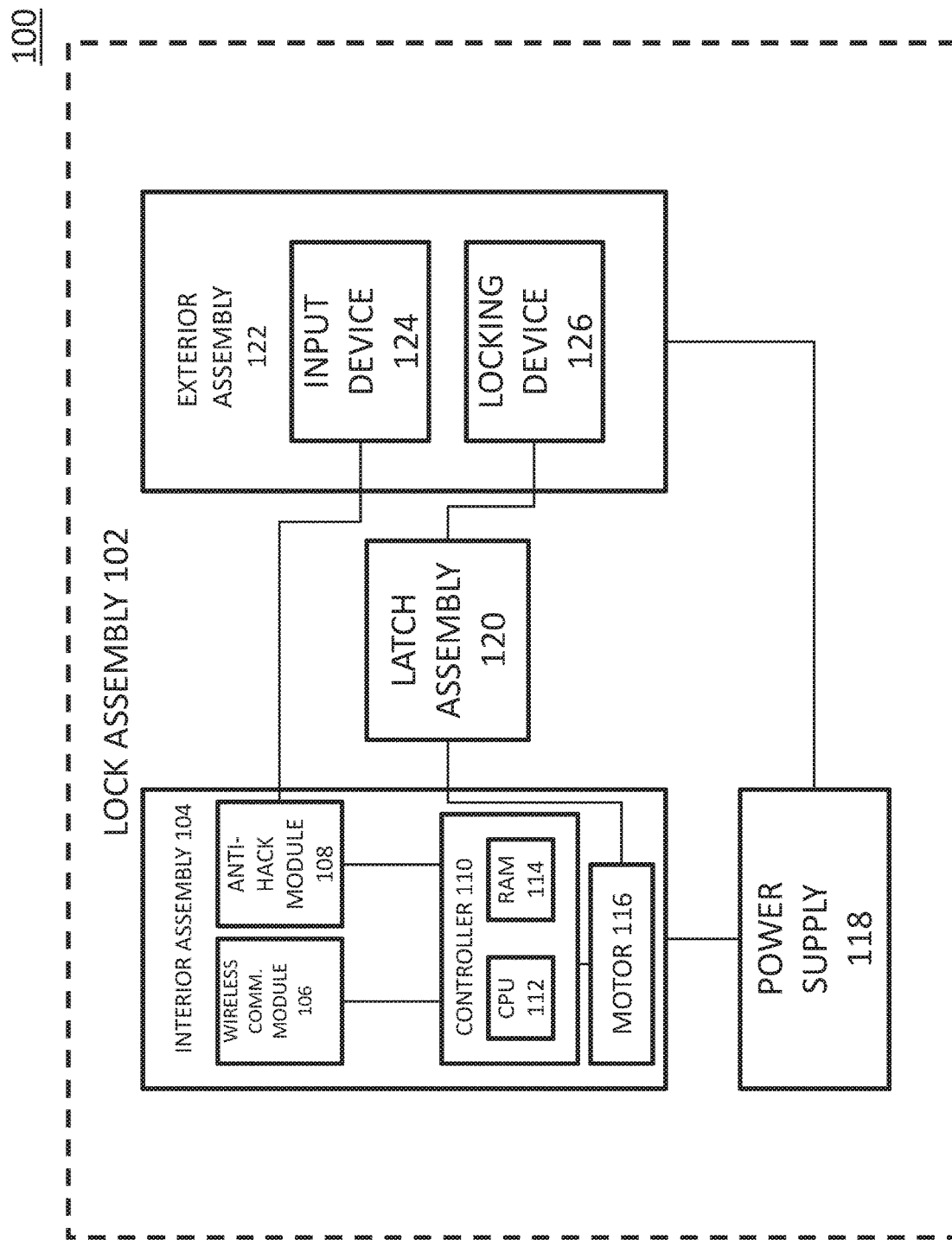
FIG. 1 is a simplified block diagram of a lock assembly according to an embodiment of the disclosure.

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

In some embodiments, this disclosure relates to methods of detecting specific types of hacking attacks that have been developed and integrated into a lockset, such as a wireless lockset. Referring to FIG. 1, there is shown an example wireless lockset with an anti-hacking feature, which is illustratively shown as an anti-hacking circuit 100. Although the term "circuit" is illustratively used to describe the anti-hacking feature, the disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the example shown, the circuit 100 includes a lock assembly 102 that includes an interior assembly 104 and an exterior assembly 122 that are typically mounted on the inside and outside of a door, respectively. As shown, the circuit 100 includes a power supply 118 for electrically powering the circuit 100, which could be batteries, a solar cell or other power source. In the embodiment shown, the circuit 100 includes a latch assembly 120 that is typically movable between locked and unlocked positions either manually or electronically, such as by a motor 116. The interior assembly 104 may include a wireless communication module 106, an anti-hacking module 108, and a controller. The controller 110 may further include a processing unit ("CPU") 112 and a memory ("RAM") 114. The exterior assembly 122 may include an input device 124, such as a keypad for entering a pin code, and a locking device 126. The controller 110 may include a wireless communication module 106 that facilitates wireless communications with a gateway (not shown), a user's mobile device (not shown) or other connected device for alerts, remote commands and/or other messaging with the circuit 100, which could be through any one or more associated wireless communication protocols (e.g., Bluetooth®, Wi-Fi®, WiMAX, Zigbee®, Z-Wave®, etc.).

The anti-hacking module 108 of the lock assembly 102 may be embodied as hardware, firmware, software, or a combination thereof. As such, in some embodiments, the anti-hacking module may be embodied as circuitry or a collection of electrical devices (e.g., packet inspection circuitry, timing attack detector circuitry, flooding attack detector circuitry, etc.). It should be appreciated that, in such embodiments, one or more of the circuitry may form a portion of the processor, memory and/or other electrical components of the lock assembly.

Figure 2:
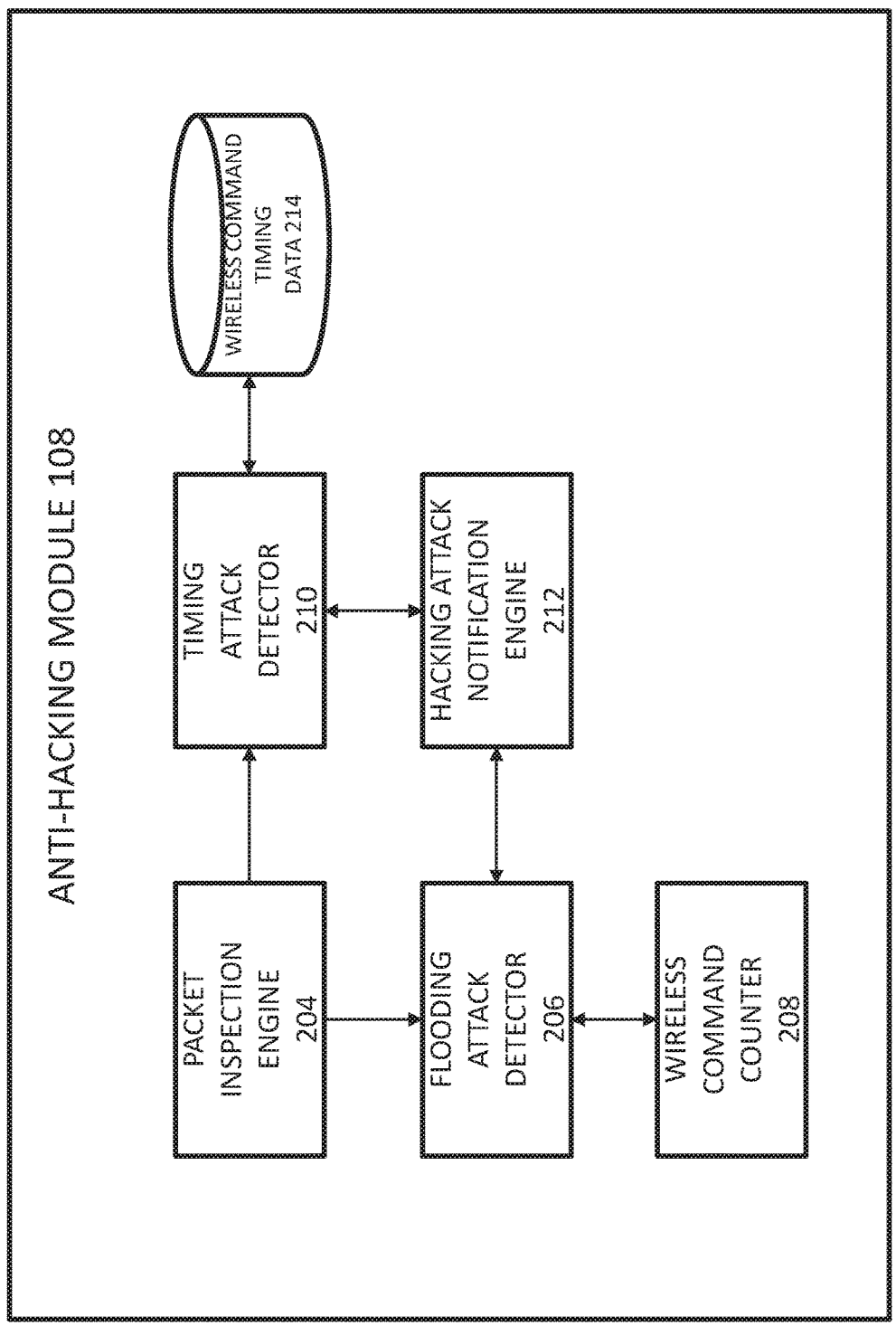
FIG. 2 is a simplified block diagram of an anti-hacking module according to an embodiment of the disclosure.

Referring to FIG. 2, there is shown an example block diagram 200 of the anti-hacking module 108 for at least one embodiment of the present disclosure. In the example shown, the anti-hacking module 108 may include a packet inspection engine 204, a flooding attack detector 206, a wireless command counter 208, a timing attack detector 210, and a hacking attack notification engine 212. In some embodiments, the packet inspection engine 204 inspects packets received by the wireless communication module 106. These packets could be provided to the flooding attack detector 206 to determine whether the packet is part of a flooding attack, which could be based on data regarding a number of commands received by the wireless command counter 208. The packets could also be provided to the timing attack detector 210 to determine whether the packet is part of a timing attack. The timing attack detector 210 may be in further communication with a database 214 to store wireless command time data. If the flooding attack detector 206 and/or the timing attack detector 210 determine that a packet may be part of an attack, a message will be provided to the hacking attack notification engine, which will provide an alert to such attack. Depending on a desired configuration, the series of engines and detectors depicted in the anti-hacking module, which may be realized in a combination of hardware and/or software, may be in communication with one another as illustrated by the appropriate arrows. It is noted that this configuration is merely for exemplary purposes only and may be rearranged as needed.

Figure 3:
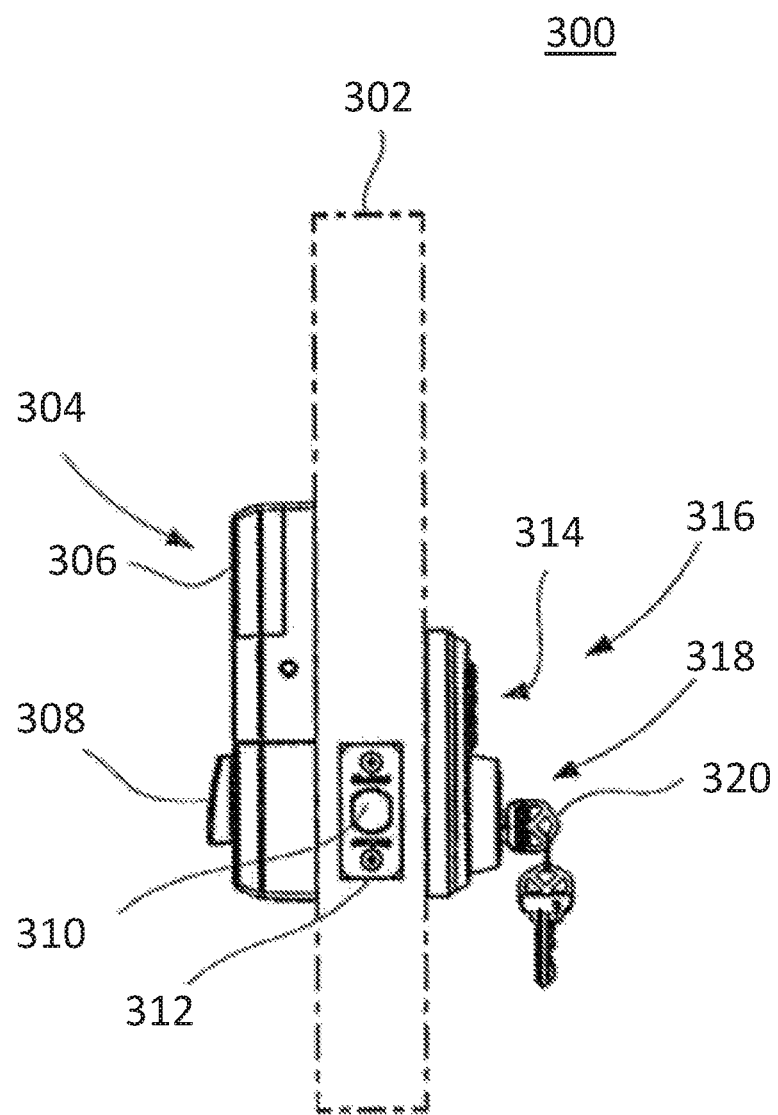
FIG. 3 is a side view of an electronic lockset in accordance with an embodiment of the present invention, installed on a door and with the door shown in phantom lines.

FIG. 3 shows an exemplary electronic lockset 300 in accordance with an embodiment of the present disclosure mounted to a door 302. In the example shown, the electronic lockset 300 includes an interior assembly 304 with a battery holder 306, a turnpiece 308, a bolt 310, a strike 312, a user input 314, an exterior assembly 316, a mechanical locking assembly 318, and a key 320. In some cases, the credentials and/or commands may be provided wirelessly to the electronic lockset 300, such as disclosed in U.S. Pat. No. 9,670,696, which is hereby incorporated by reference. In another example, the electronic lockset may be equipped to receive user credentials via touch activation, such as disclosed in U.S. Pat. No. 9,024,759, which is hereby incorporated by reference.

Figure 4:
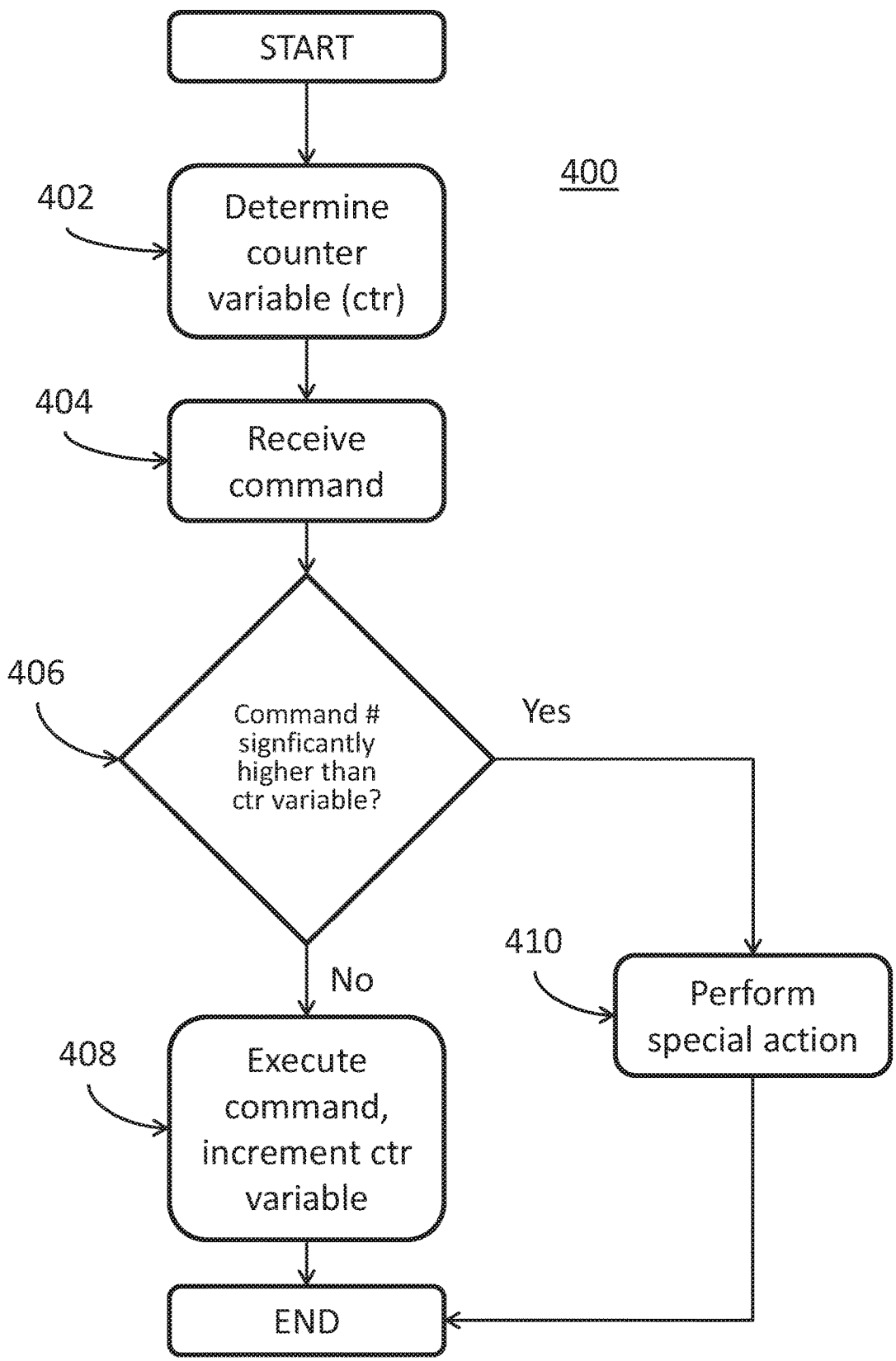
FIG. 4 is a flow diagram of an exemplary method for detecting an out of sequence command according to an embodiment of the disclosure.

FIG. 4 is a simplified flowchart showing an example anti-hacking method 400 of a wireless lockset 300 using the anti-hacking module 108 to detect a command with an out of order frame count. In this example, the method 400 begins with block 402, in which a counter variable is determined. The counter variable may be a sequence number. The counter variable may be stored in a typical storage device or a database. With each wireless command received at the lockset, there is a sequence number associated with each command. This ensures that commands received at a lockset are executed in order. As each command executes, a counter variable may be incremented and prevent commands having a sequence number below the counter variable value from being executed, or, in other words, from being executed out of turn.

Turning back to FIG. 4, after the counter variable is determined, the process moves to step 404 and the wireless lockset receives a command. A decision 406 is then made to detect an anomaly based on the sequence number associated with the received command. If the sequence number is significantly higher than the counter variable by a predetermined amount, the process moves to step 410 and a special action is performed. The special action may include, but is not limited to, timeouts, keypad disable, wireless disable, notifications, audible alarms, wireless alarms, LED indicators, and an automatic lock/unlock action, or the like. In the event that the command sequence number is not deemed to be significantly higher, the process moves to step 408 and normal processing of the command resumes. In this example scenario, the command is executed and the counter variable is incremented. A typical command may be a lock command of the lockset or an unlock command of the lockset. The anomaly detection of FIG. 4 is directed towards the detection of out of order frame count. In this example, a hacker may attempt to issue a false command and program the false command to have a very high sequence number.

Figure 5:
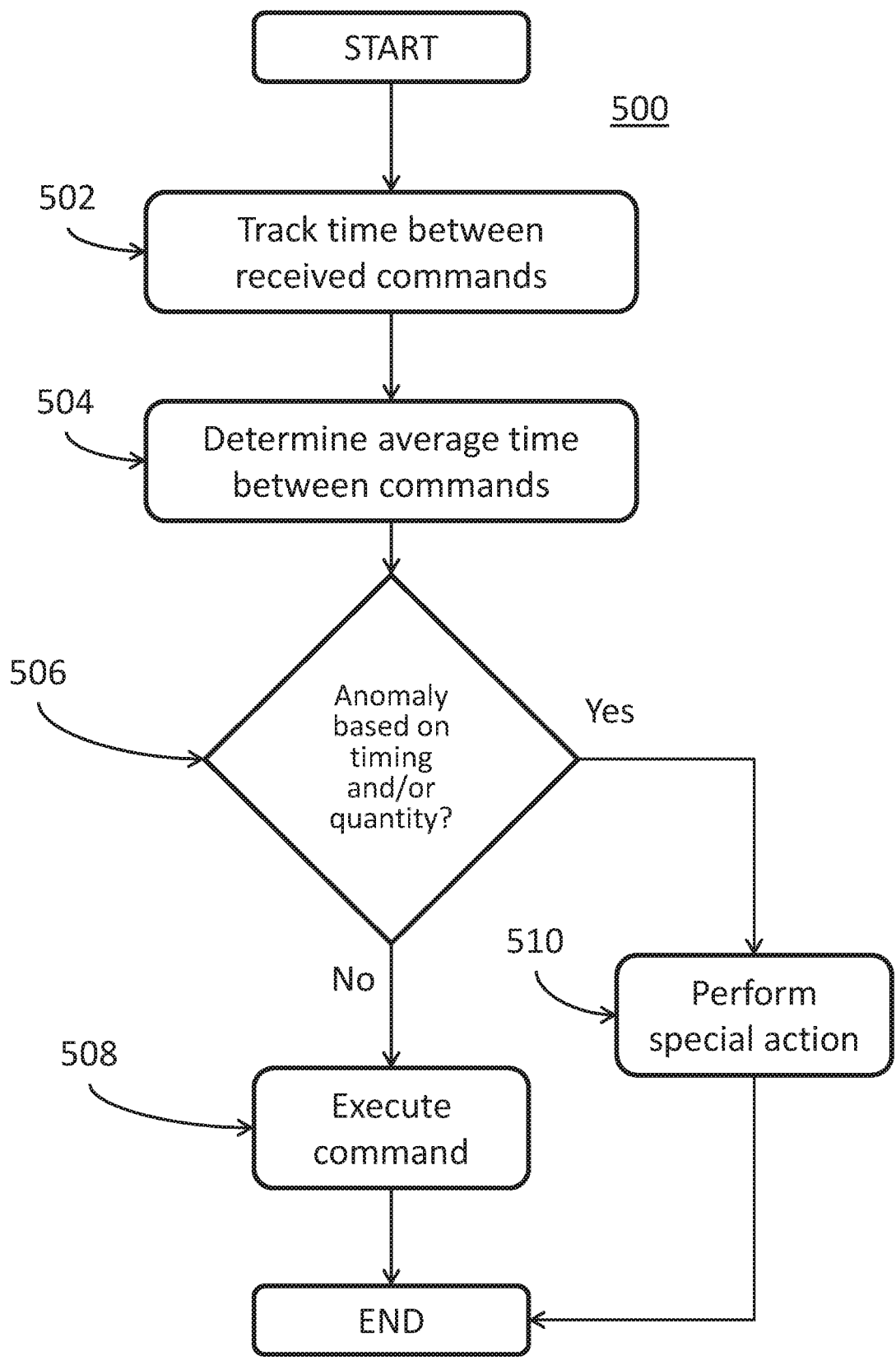
FIG. 5 is a flow diagram of an exemplary method for detecting a flooding attack according to an embodiment of the disclosure.

FIG. 5 is a simplified flowchart showing an example anti-hacking method of a wireless lockset 300 using the anti-hacking module 108 to detect a flooding attack. In this example, the method 500 begins with step 502 to track the time between received commands. The tracked time variables may be stored in a storage device or a database, for example. In step 504, the average time between commands may be determined and stored as a variable, for example a Delta variable. In decision block 506 an anomaly is determined to be present based on either the quantity of commands received within a certain period of time or the determined average time between commands received, or a combination of both. In one embodiment, recently received commands may include all commands received within the past 30 seconds or 30 minutes, for example. Alternatively, the recently received commands may include a certain amount of commands, such as the last five received commands, for example. If the average time between commands is considered to be a predetermined amount below the regular average time, an anomaly is considered to be detected and the process moves to step 510 and a special action may be performed. The special action may include, but is not limited to, timeouts, keypad disable, wireless disable, notifications, audible alarms, wireless alarms, LED indicators, and an automatic lock/unlock action, or the like. In the event that no anomaly is detected, the process moves to step 508 and the command is executed.

Figure 6:
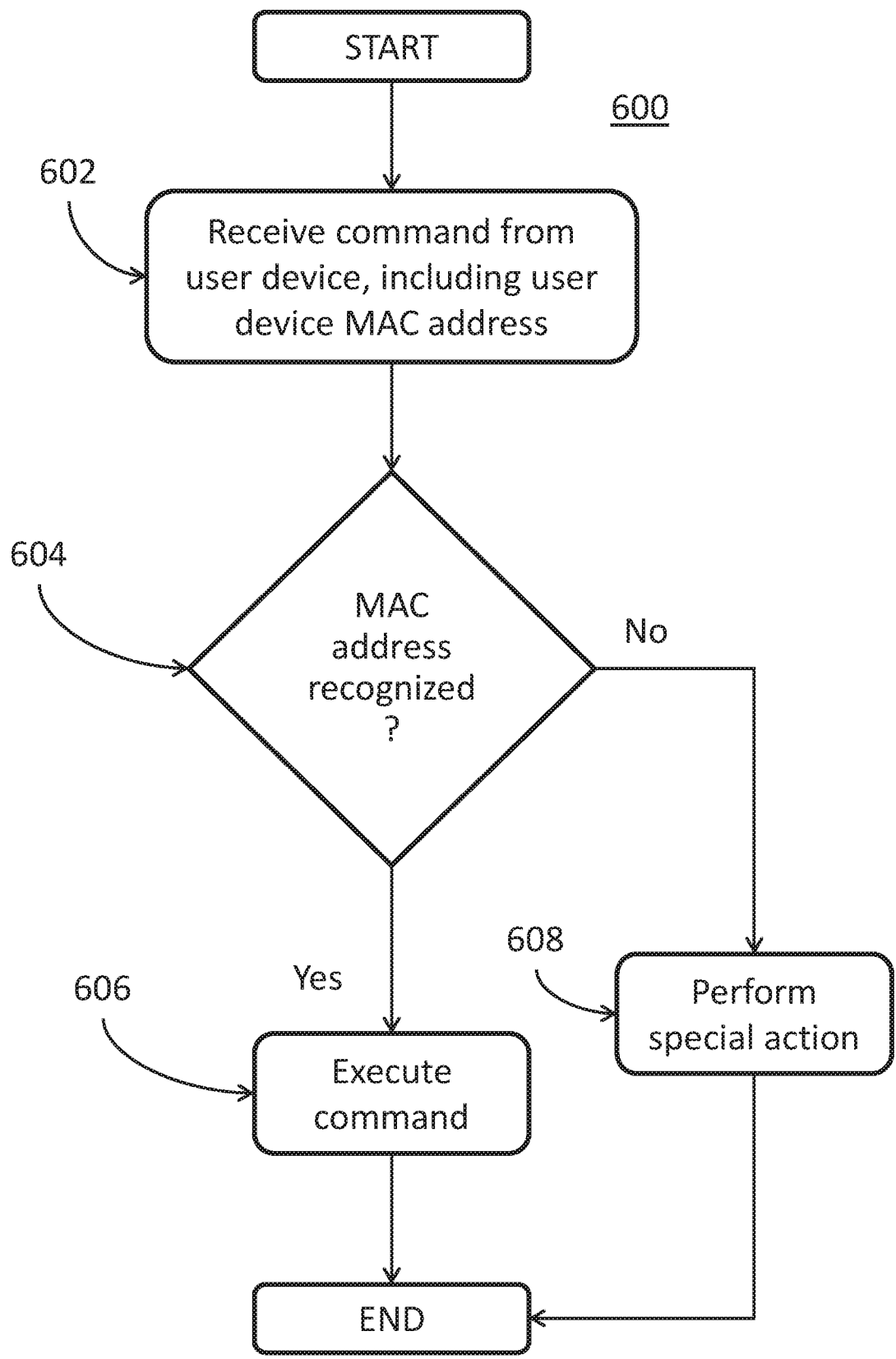
FIG. 6 is a flow diagram of an exemplary method for detecting a valid MAC address of a device according to an embodiment of the disclosure.

FIG. 6 is a simplified flowchart showing an example anti-hacking method of a wireless lockset 300 using the anti-hacking module 108. In this example, the method 600 begins with receiving a command at the lockset 300 from a user device at step 602. The command includes an identifier of the user device. In one embodiment, the identifier may be a MAC address of the user device. At decision block 604, the lockset 300 determines if the identifier is recognized. For example, the identifier may be compared to a table of trusted or valid identifiers. Continuing with the example above, the table may comprise a list of valid MAC addresses determined to be associated with a trusted user device. In the event that the identifier is recognized and therefore no anomaly is detected, the process moves to step 606 and the command is executed. In the event that the identifier is not recognized and therefore an anomaly is detected, the process moves to step 608 and a special action may be performed. The special action may include, but is not limited to, timeouts, keypad disable, wireless disable, notifications, audible alarms, wireless alarms, LED indicators, and an automatic lock/unlock action, or the like.

Examples

Illustrative examples of the lockset disclosed herein are provided below. An embodiment of the lockset may include any one or more, and any combination of, the examples described below.

Example 1 is a lockset that includes a latch assembly, a controller, an interior assembly and an exterior assembly. The latch assembly has a bolt movable between an extended position and a retracted position. The controller is configured to electronically control movement of the bolt between the extended position and the retracted position. The interior assembly includes a turnpiece for manually actuating the bolt between the extended position and the retracted position. The exterior assembly includes a mechanical lock assembly configured to manually move the bolt between the extended position and the retracted position. The controller is configured to determine a command sequence number, receive at least one command, compare the command sequence number with a sequence number associated with the received command to identify an anomaly, execute the command in response to an anomaly not being identified, and perform a special action in response to an anomaly being identified.

In Example 2, the subject matter of Example 1 is further configured such that the command sequence number is incremented in response to the received command being executed.

In Example 3, the subject matter of Example 1 is further configured such that the command, when executed, causes the bolt to move into the extended position or the retracted position.

In Example 4, the subject matter of Example 1 is further configured such that the special action includes at least one of a timeout, a keypad disable, a wireless disable, a notification, an audible alarm, a wireless alarm, an LED indicator, and an automatic lock/unlock of the lockset.

In Example 5, the subject matter of Example 1 is further configured such that the anomaly is identified when the received command sequence number is significantly greater than the command sequence number.

In Example 6, the subject matter of Example 1 is further configured such that the anomaly is identified when a difference between the received command sequence number and the command sequence number exceeds a predetermined amount.

Example 7 is a lockset that includes a latch assembly, a controller, an interior assembly, and an exterior assembly. The latch assembly includes a bolt movable between an extended position and a retracted position. The controller is configured to electronically control movement of the bolt between the extended position and the retracted position. The interior assembly includes a turnpiece for manually actuating the bolt between the extended position and the retracted position. The exterior assembly includes a mechanical lock assembly configured to manually move the bolt between the extended position and the retracted position. The controller is configured to track a series of commands received at the controller, execute at least one of the series of commands in response to determining that an anomaly has not been detected based on a quantity and/or a timing of the series of commands, and perform a special action in response to determining that an anomaly has been detected based on a quantity and/or a timing of the series of commands.

In Example 8, the subject matter of Example 7 is further configured such that the timing is based on an average time between received commands.

In Example 9, the subject matter of Example 7 is further configured such that the quantity is based on a certain amount of commands received within a predetermined period of time.

In Example 10, the subject matter of Example 7 is further configured such that the special action includes at least one of a timeout, a keypad disable, a wireless disable, a notification, an audible alarm, a wireless alarm, a LED indicator, and an automatic lock/unlock of the lockset.

In Example 11, the subject matter of Example 7 is further configured such that the command, when executed, causes the bolt to move into the extended position or the retracted position.

Example 12 is a lockset that includes a latch assembly, a controller, an interior assembly and an exterior assembly. The latch assembly includes a bolt movable between an extended position and a retracted position. The controller is configured to electronically control movement of the bolt between the extended position and the retracted position. The interior assembly includes a turnpiece for manually actuating the bolt between the extended position and the retracted position. The exterior assembly includes a mechanical lock assembly configured to manually move the bolt between the extended position and the retracted position. The controller is further configured to receive at least one command from a device, wherein the at least one command comprises an identifier associated with the device, determine if the identifier is recognized, execute the command in response to the identifier being recognized, and perform a special action in response to the identifier not being recognized.

In Example 13, the subject matter of Example 12 is further configured such that the identifier is compared to a list of known identifiers to determine if the identifier is recognized.

In Example 14, the subject matter of Example 12 is further configured such that the identifier is a MAC address.

In Example 15, the subject matter of Example 12 is further configured such that the special action includes at least one of a timeout, a keypad disable, a wireless disable, a notification, an audible alarm, a wireless alarm, a LED indicator, and an automatic lock/unlock of the lockset.

In Example 16, the subject matter of Example 12 is further configured such that the command, when executed, causes the bolt to move into the extended position or the retracted position.

Although the present disclosure has been described with reference to particular means, materials and embodiments, from the foregoing description, one skilled in the art can easily ascertain the essential characteristics of the present disclosure and various changes and modifications may be made to adapt the various uses and characteristics without departing from the spirit and scope of the present invention as set forth in the following claims.

What is claimed is:

1. A lockset comprising:
   a latch assembly including a bolt movable between an extended position and a retracted position;
   a controller configured to electronically control movement of the bolt between the extended position and the retracted position;
   a wireless communication interface communicatively connected to the controller;
   an interior assembly including a turn piece for manually actuating the bolt between the extended position and the retracted position;
   an exterior assembly including a mechanical lock assembly configured to manually move the bolt between the extended position and the retracted position;
   wherein the controller is further configured to:
      determine a command sequence number;
      receive at least one command via the wireless communication interface;
      compare the command sequence number with a sequence number associated with the received command to identify an anomaly, wherein the anomaly is a potential hacking attempt;
      execute the at least one command in response to an anomaly not being identified; and
      perform a special action in response to an anomaly being identified, wherein the special action is different than the at least one command.

2. The lockset as recited in claim 1, wherein the command sequence number is incremented in response to the received command being executed.

3. The lockset as recited in claim 1, wherein the at least one command, when executed, causes the bolt to move into the extended position or the retracted position.

4. The lockset as recited in claim 1, wherein the special action includes at least one of: timeouts, keypad disable, wireless disable, notifications, audible alarms, wireless alarms, LED indicators, and an automatic lock/unlock of the lockset.

5. The lockset as recited in claim 1, wherein the anomaly is identified when the received command sequence number is significantly greater than the command sequence number.

6. The lockset as recited in claim 1, wherein the anomaly is identified when a difference between the received command sequence number and the command sequence number exceeds a predetermined amount.

7. The lockset as recited in claim 1, wherein the wireless communication interface is configured to communicate with a mobile device.

8. The lockset as recited in claim 1, wherein the special action includes disabling the wireless communication interface for a predetermined period of time.

9. The lockset as recited in claim 8, wherein the special action further includes generating at least one wireless alarm.

10. A lockset comprising:
    a latch assembly including a bolt movable between an extended position and a retracted position;
    a controller configured to electronically control movement of the bolt between the extended position and the retracted position;
    a wireless communication interface communicatively connected to the controller;
    an interior assembly including a turn piece for manually actuating the bolt between the extended position and the retracted position;
    an exterior assembly including a mechanical lock assembly configured to manually move the bolt between the extended position and the retracted position;
    wherein the controller is further configured to:
       track a series of commands received at the wireless communication interface;
       execute at least one of the series of commands in response to determining that an anomaly has not been detected based on a quantity and/or a timing of the series of commands wherein the anomaly is a potential hacking attempt; and
       perform a special action in response to determining that an anomaly has been detected based on a quantity and/or a timing of the series of commands, wherein the special action is different than the at least one of the series of commands.

11. The lockset as recited in claim 10, wherein the timing is based on an average time between received commands.

12. The lockset as recited in claim 10, wherein the quantity is based on a certain amount of commands received within a predetermined period of time.

13. The lockset as recited in claim 10, wherein the special action includes at least one of: timeouts, keypad disable, wireless disable, notifications, audible alarms, wireless alarms, LED indicators, and an automatic lock/unlock of the lockset.

14. The lockset as recited in claim 10, wherein the series of commands, when executed, causes the bolt to move into the extended position or the retracted position.

15. A lockset comprising:
    a latch assembly including a bolt movable between an extended position and a retracted position;
    a controller configured to electronically control movement of the bolt between the extended position and the retracted position;
    a wireless communication interface communicatively connected to the controller;

an interior assembly including a turn piece for manually actuating the bolt between the extended position and the retracted position;

an exterior assembly including a mechanical lock assembly configured to manually move the bolt between the extended position and the retracted position;

wherein the controller is further configured to:

receive at least one command, via the wireless communication interface, from a device, wherein the at least one command comprises an identifier associated with the device;

determine if the identifier is recognized;

execute the at least one command in response to the identifier being recognized; and perform a special action in response to the identifier not being recognized, wherein the special action is different than the at least one command.

16. The lockset as recited in claim 15, wherein the identifier is compared to a list of known identifiers to determine if the identifier is recognized.

17. The lockset as recited in claim 15, wherein the identifier is a media access control (MAC) address of the device transmitting the at least one command to the lockset.

18. The lockset as recited in claim 15, wherein the special action includes at least one of: timeouts, keypad disable, wireless disable, notifications, audible alarms, wireless alarms, LED indicators, and an automatic lock/unlock of the lockset.

19. The lockset as recited in claim 15, wherein the at least one command, when executed, causes the bolt to move into the extended position or the retracted position.

20. The lockset as recited in claim 17, wherein the MAC address of the device is compared to a list of valid MAC addresses, each of the list of valid MAC addresses being associated with a trusted user device.

\* \* \* \* \*